June 30, 1953 P. E. BAKER 2,643,445
METHOD OF MAKING COMPOSITE BRAKE DRUMS
Filed Aug. 23, 1949 2 Sheets-Sheet 1

INVENTOR.
Paul E. Baker
BY
Maurice A. Crews
ATTORNEY

June 30, 1953 P. E. BAKER 2,643,445
METHOD OF MAKING COMPOSITE BRAKE DRUMS
Filed Aug. 23, 1949 2 Sheets-Sheet 2
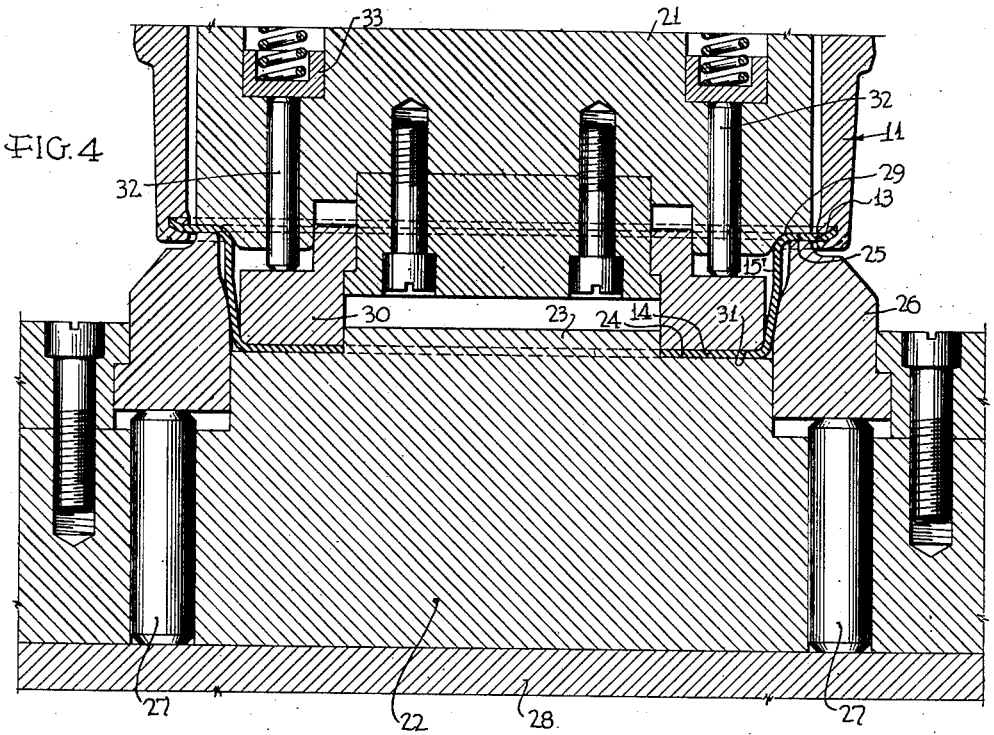
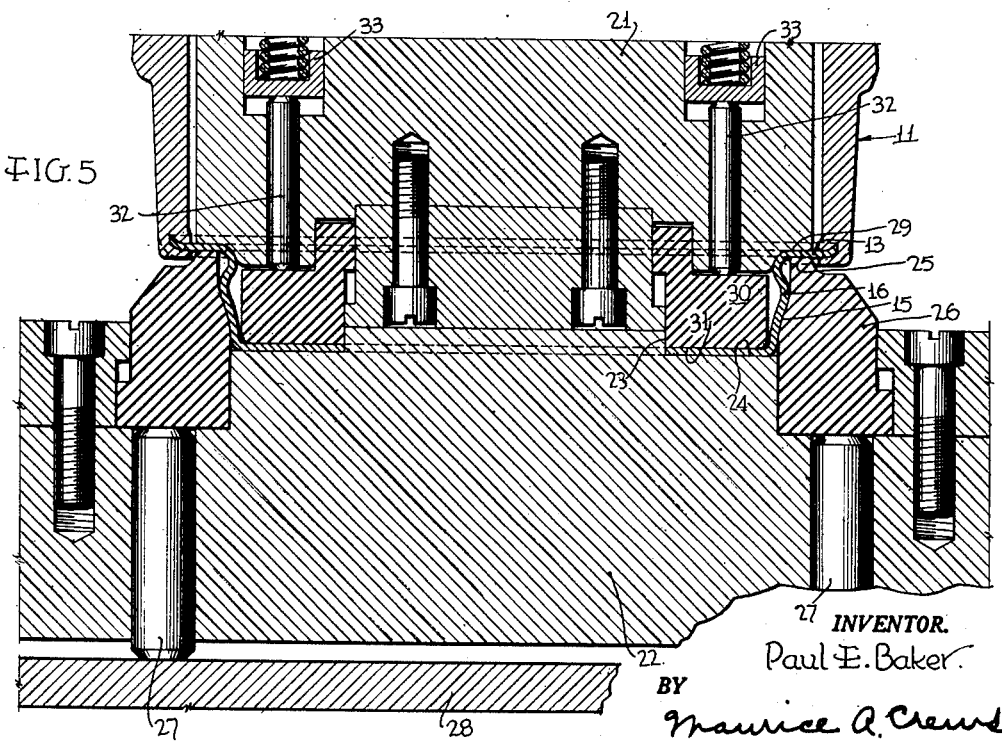
INVENTOR.
Paul E. Baker
BY Maurice A. Crews
ATTORNEY Patented June 30, 1953

2,643,445

UNITED STATES PATENT OFFICE 2,643,445

METHOD OF MAKING COMPOSITE BRAKE DRUMS

Paul E. Baker, Grosse Pointe Farms, Mich., assignor to The Budd Company, Philadelphia, Pa., a corporation of Pennsylvania Application August 23, 1949, Serial No. 111,801

3 Claims. (Cl. 29—152.2)

The invention relates to composite brake drums and more particularly to the method of manufacturing such drums.

Such drums, as heretofore constructed, comprise an annular drum portion of cast iron or the like, cast onto a sheet metal head. Such head consists of axially spaced radially outer and inner peripheral portions, the drum portion being cast onto the periphery of the outer peripheral portion and the radially inner peripheral portion forming a bolting-on flange for securing the drum to a hub flange. Connecting the radially inner margin of the radially outer portion and the radially outer margin of the radially inner portion is a generally axially extending intermediate portion in which is pressed an annular radially outwardly projecting rib, which provides a channel in which any oil finding its way inside the drum may collect, and be thrown off through spaced openings provided in the bottom of the channel.

Heretofore, the entire head portion of the drum was first formed to its final form including the rib above referred to, after which the drum annulus was cast onto the periphery of the sheet metal head. This method resulted in frequent replacement of the die parts, through which the rib was formed and, due to the presence of this rib in the casting operation, led to a breakdown of the sand in the mold, which resulted in numerous castings being defective and rejected.

It was with a view to simplifying the operation of forming the drum and to avoid the above-mentioned drawbacks, that the method of manufacture forming the subject of this application was devised. It was found that by the use of this process a material saving in manufacturing cost could be effected.

The process consists essentially of first forming the head without the annular bead and with an axially extending portion of somewhat greater width than its width in the finally formed head and which may be slightly tapered for at least part of its width and has no radial projection from its outside face, then casting the annular drum to the periphery of this partially-formed head, and finally upsetting the axially extending portion by axially directed pressure so that the annular bead is formed therein.

The objects of the invention and the manner in which they are achieved will become clear from the following detailed description when read in connection with the drawings forming a part of this specification.

In the drawings:

Fig. 4 is an axial cross section through a set of dies by which the bead may be finally pressed out of the partially formed drum shown in Fig. 3, the work being shown in position between the dies at the commencement of the operation, and Fig. 5 is a view similar to Fig. 4, showing the dies closed, and the work in position therebetween upset axially to form the annular head therein.

Figure 1:
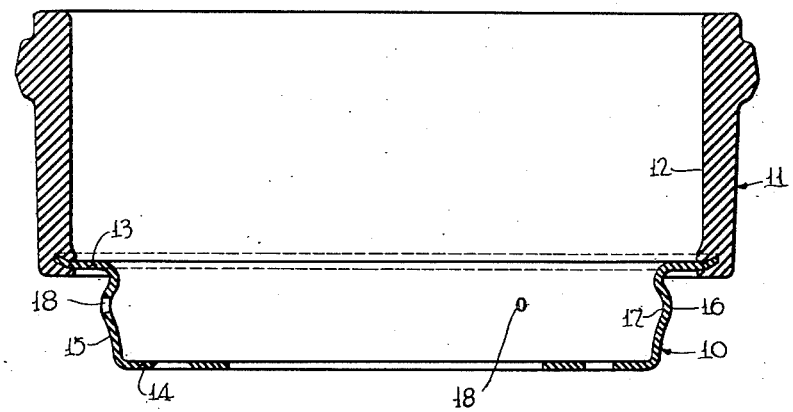
Fig. 1 shows in axial cross section a complete brake drum of the class to which the invention relates.

The drum to be produced by the method of the invention comprises, as shown in Fig. 1, the sheet metal head 10 to the periphery of which is cast in a usual manner, the annular drum proper 11 having the braking surface 12 on its inner cylindrical face.

The head is shown as having axially spaced generally radially extending outer and inner portions 13 and 14, which are interconnected by an intermediate generally axially extending portion 15. The radially extending peripheral portion 13 is cast into the annular drum 11 and the radially extending inner portion 14 serves as a bolting-on portion through which the drum is secured to the hub of a wheel.

To prevent oil from the hub from reaching the braking surface 12, the axially extending portion 15 is formed with an annular outwardly projecting bead 16 forming a channel 17 in which oil may collect and be thrown radially outwardly through openings, as 18, provided at circumferentially spaced points in the bead 16.

Figure 2:
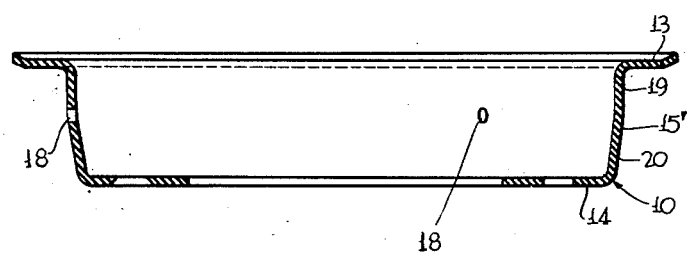
Fig. 2 shows a similar cross section of the partially formed brake drum head.

According to the novel method, the drum as above described is produced as follows:

First, the head is formed by die stamping or otherwise from a flat blank to its partially completed form, shown in Fig. 2.

In this partly completed form, the flanges 13 and 14 may be in their final form but the intermediate axially extending portion 15' is formed with a generally cylindrical portion 19 adjacent portion 13 which merges into an inclined or frustoconical portion 20 adjacent the radially extending bolting-on portion 14. Also, the axial distance between the flanges 13 and 14 is somewhat greater than in the final form drum, so as to provide the necessary metal for the final forming operation.

Figure 3:
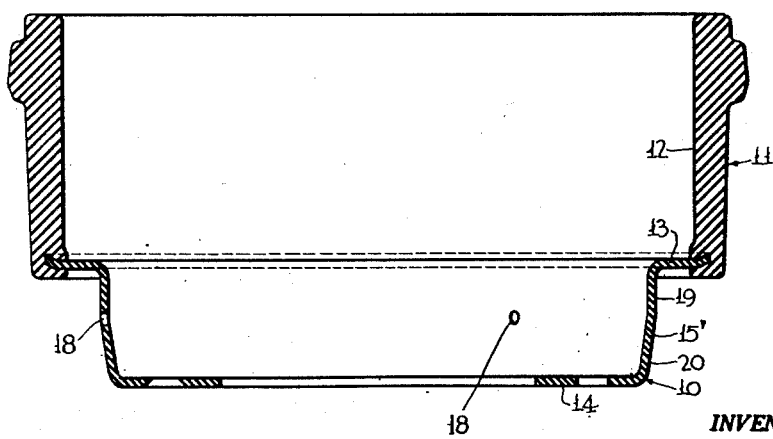
Fig. 3 shows a similar cross section through the partially formed brake drum head and the drum annulus cast thereon.

The partially formed head 10 of Fig. 2 is then placed in a mold and the drum proper 11 is cast onto its periphery to produce the partly completed drum shown in Fig. 3. This constitutes the second step in the method of the invention.

The partially completed drum is now ready for the final forming operation, between dies, as indicated in Figs. 4 and 5.

While the plunger or upper die 21 is in a raised position, the partially formed drum of Fig. 3 is centered on the lower die 22, through the pilot 23 fitting its central opening. The bolting-on portion 14 then rests upon the flat annular face 24 of the lower die and the radial peripheral portion 13 rests upon a face 25 formed on an annular die 26 floatingly carried by the lower die 22. This floating die 26 is normally held raised by plungers 27 extending through the lower die body and acted upon by a pressure plate 28, yieldingly held by suitable means (not shown) in the raised position shown in Fig. 4.

The upper die 22, carries a work-engaging face 29 opposed to the face 25 and when it descends to the position shown in Fig. 4 the radial portion 13 is clamped firmly between the upper die face 29 and the face 25 of the floating die 26. At the same time a floating die 30 has its flat annular face 31 engage the radial bolting-on portion 14 to clamp it to the face 24 of the lower die 23. This floating die 30 is held in its lower position through the action of pins 32 and a spring pressed follower or followers 33 carried by the upper die.

With the parts in the position of Fig. 4 it will be seen that further descent of the upper die will shorten the distance between the die faces 29 and 24 and this results in the final form shown in Fig. 5 in which the axially extending intermediate portion 15' is upset to shorten its axial length (as shown at 15 Fig. 5) and form the outwardly projecting bead 16 therein. It will be noted that the face of the floating die 26 laterally of the intermediate portion 15 is shaped to conform to the final form of the bead and since this floating die is depressed in the final forming operation against the yieldingly held pressure plate 28, the return of the upper die to the raised position will allow the work to be lifted by the floating die, so that it can be readily removed and a new work-piece inserted between the forming dies.

While a specific form of die has been shown and described for carrying out the final step of the method, it will be understood that changes and modifications may be made by those skilled in the art, without departing from the spirit and scope of the invention.

What is claimed is:

1. The method of making brake drums having an annular drum portion cast onto the generally radially extending peripheral portion of a sheet metal head portion, the head portion having radially inward of said radially extending peripheral portion, a generally axially extending tapered portion formed with an annular bead providing a radially inwardly opening oil-catching channel, and the axially extending portion terminating in a generally radially extending bolting-on portion, comprising the steps of first forming the head portion without the annular bead portion and with an axially extending tapered portion of somewhat greater width than its width in the finally formed drum, then casting the annular drum portion onto the periphery of the head portion, and finally, clamping the radial portions between dies which have elements arranged to brace part of the axial portion at spaced points on opposite sides, leaving a part therebetween unsupported and upsetting and fore-shortening the axially-extending portion to form the annular bead therein by moving said dies axially toward each other.

2. The method of making brake drums having an annular drum portion cast onto the generally radially extending peripheral portion of a sheet metal head portion, the head portion having radially inwardly of said radially extending peripheral portion, a generally axially extending portion formed with an annular bead providing a radially inwardly opening oil-receiving channel, and the axially extending portion terminating in a generally radially extending bolting-on portion, comprising the steps of first forming the head with the radial peripheral portion and the radial bolting-on portion interconnected by a slightly inclined axially extending portion of greater axial length than the axial length between said radially extending portions in the final drum, then casting the annular drum portion onto the periphery of the head portion and finally clamping the radial portions between suitable dies and axially moving said dies toward each other to upset and fore-shorten the inclined generally axially extending portion to form the annular bead therein.

3. The method of making brake drums having an annular drum portion cast onto the generally radially extending peripheral portion of a sheet metal head portion, the head portion comprising an axially spaced radially extending bolting-on portion, the outer periphery of which is joined to the inner periphery of the radially extending peripheral portion by a generally axially extending portion formed with a radially outwardly projecting annular bead forming a radially inwardly opening oil-catching channel, comprising the steps of first forming the axially extending portion of the head portion without the bead and of greater width than in the finally formed drum and having outward taper between the inner and outer radial portions, then casting the annular drum portion onto the head, and finally, clamping the radial portions between dies which have elements arranged to brace part of the axial portion at spaced points on opposite sides, leaving a part therebetween unsupported and by pressure applied in opposite axial directions by the dies to the generally radially extending peripheral and bolting-on portions of the head, upsetting and fore-shortening the metal of the generally axially extending portions to form the annular bead therein.

PAUL E. BAKER.

References Cited in the file of this patent

UNITED STATES PATENTS

| Number | Name | Date |
| --- | --- | --- |
| 1,980,264 | Giesler | Nov. 13, 1934 |
| 2,026,878 | Farr | Jan. 7, 1936 |
| 2,129,199 | Dake | Sept. 6, 1938 |
| 2,162,072 | Eksergian | June 13, 1939 |
| 2,262,604 | Eksergian | Nov. 11, 1941 |
| 2,485,969 | Johnson | Oct. 25, 1949 |